June 2, 1964     H. J. SUTTON     3,135,370

VISCOUS FLUID COUPLING DRIVE

Filed Sept. 2, 1960

INVENTOR.

Hal J. Sutton

BY

C. L. Spencer

ATTORNEY

United States Patent Office 3,135,370
Patented June 2, 1964

3,135,370
VISCOUS FLUID COUPLING DRIVE
Hal J. Sutton, Flint, Mich., assignor to General Motors Corporation, Detroit, Mich., a corporation of Delaware
Filed Sept. 2, 1960, Ser. No. 53,765
4 Claims. (Cl. 192—58)

This invention relates to a viscous fluid coupling and more particularly to a hydraulic drive for a vehicle engine cooling fan of the type utilizing a viscous fluid as the working fluid through which the torque is transmitted.

In accordance with this invention a fluid coupling is automatically regulated by air temperature under a vehicle hood to increase the fan speed as the under hood air temperature increases to thereby provide necessary cooling. A thermostatically modulated fan operation is desirable in order to reduce power losses and fan noise when cooling is not required or when limited cooling is required. When cooling is required, the fan speed increases in accordance with cooling demands to a selected maximum design speed. The fan may be driven at any speed between a minimum and the maximum design speed in accordance with cooling demand.

An object of this invention is to provide a hydraulic variable speed fluid coupling of the type employing viscous fluid wherein the quantity of viscous fluid in the working chamber may be varied in accordance with cooling requirements.

Another object of this invention is to provide a novel spring valve arrangement for controlling the quantity of working fluid in a working chamber in accordance with changes in cooling demand.

An additional object of this invention is to provide a fluid coupling arrangement incorporating a novel spring valve arrangement for controlling the quantity of working fluid in a working chamber which is economical to manufacture and assemble.

A further object of this invention is to provide means for pumping viscous fluid out of a working chamber when cooling demands are minimum.

An additional object of this invention is to provide a fan drive arrangement of the type disclosed mounted directly upon and driven by a water pump shaft.

These and other objects of this invention will be apparent from the following description and claims taken in conjunction with the accompanying drawings, in which:

Figure 1:
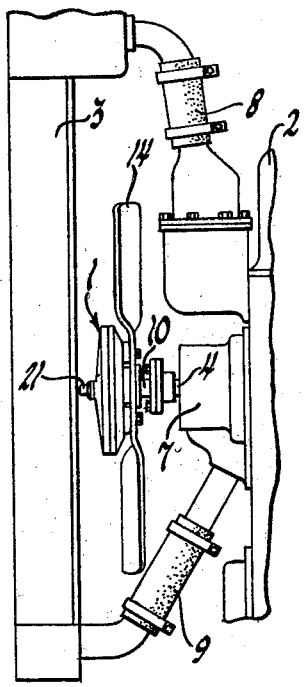
FIGURE 1 is a side elevation of fluid coupling drive unit incorporating the principles of this invention showing the unit mounted on a water pump drive shaft and positioned between a radiator and an engine.
Figure 2:
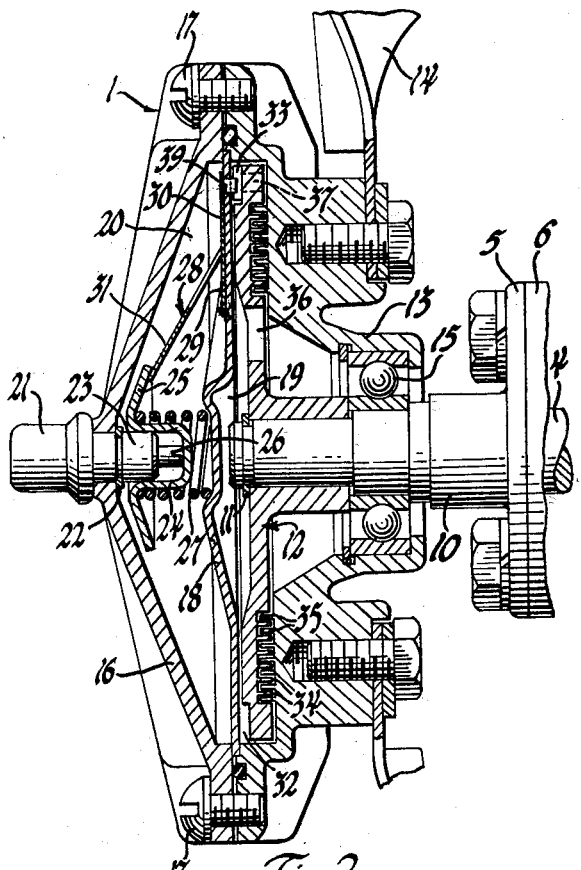
FIGURE 2 is a sectional view of a fan drive assembly taken along the line 2—2 of FIGURE 3.

As shown in FIGURE 1, a fluid coupling drive unit 1 is disposed under a vehicle hood between an engine 2 and a radiator 3. A stub shaft 10 is fixed to an engine driven shaft 4 by means of flanges 5 and 6 bolted together as best shown in FIGURE 2. Shaft 10 is continuously engine driven and supports the unit 1. Thus no fan drive pulleys and belts are required, resulting in cost reductions. Shaft 4, which is engine driven may be directly driven from an engine crankshaft, not shown, and preferably constitutes an extension of a water pump drive shaft (not shown) for water pump 7. Water pump 7 circulates cooling fluid to radiator 3 through the hose 8, the water returning to the engine through hose 9.

While the fluid coupling drive unit herein disclosed is incorporated specifically in a fan drive arrangement, it will be understood that it may be useful in other applications wherein it may be desirable to vary the speed of a driven member with respect to that of a drive member in accordance with changes in temperature.

As shown in FIGURE 2 an impeller or rotor 12 is driven by shaft 10, the impeller being fixed on shaft 10 by means of a snap ring 11. A fan hub 13 carrying fan blades 14 is supported for rotation upon shaft 10 by means of a ball bearing 15. A cover 16 is secured to fan hub 13 by means of four screws 17. A circular plate or separator member 18 supported at its periphery between fan hub 13 and cover 16 divides the space enclosed by hub 13 and cover 16 into two chambers 19 and 20. Chamber 19 may be termed a working chamber and chamber 20, a fluid reservoir. Plate 18 also serves as a spring seat for a coil spring 27. A temperature responsive power actuator 21 of well-known construction is carried by cover 16, the power element being held on cover 16 by means of a snap ring 22 and having its outer case extending into chamber 20 at 23 to provide a guide for a cup-shaped member 24 having an outwardly and downwardly extending annular flange 25 protruding from the rim of the cup. A plunger 26 of power actuator 21 seats on the bottom of cup member 24. A spring 27 seats on plate 18 and upon the base of flange 25.

A spring valve 28 formed of a sheet metal stamping is provided with a bent down foot 29, an actuator arm 31 and an outwardly extending plate portion 30, the arm 31 extending outwardly from the juncture of foot 29 and plate 30 to contact flange 25 of cup member 24. As hereafter more particularly explained, the plate 30 and foot 29 will normally contact the plate 18 when the power element 21 is cold.

Rotor 12 at its outer periphery and on the side of the rotor adjacent plate 18 has an annular channel 32 adapted to receive an arcuate shaped slipper or pump member 33. Rotor 12 at the side of the rotor opposite channel 32 has formed thereon a plurality (6 in number) of concentric upstanding rings or flanges 34 adapted to cooperate with a series of concentric upstanding rings or flanges 35 formed on fan hub 13. A series of openings 36 in rotor 12 permit the viscous fluid in chamber 19 to pass through rotor 12 to lubricate bearing 15. An opening 37 in rotor 12 is positioned radially outwardly from the series of rings 33 to permit flow of fluid through the rotor from the area of the rings. Opening 37 connects channel 32 to the side of the rotor adjacent fan hub 13.

Figure 3:
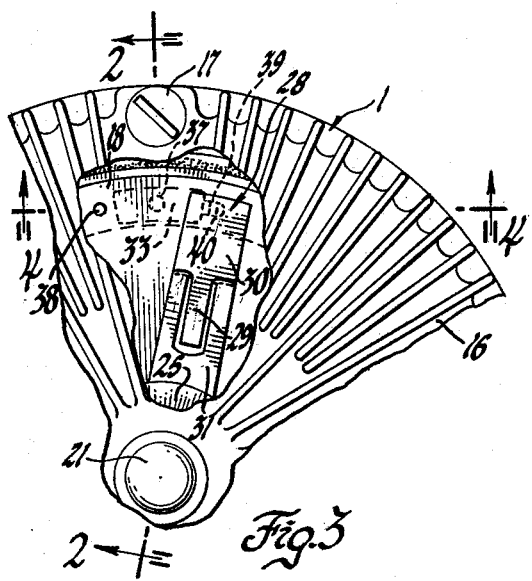
FIGURE 3 is an elevational view of the assembly with the cover partially broken away.
Figure 4:
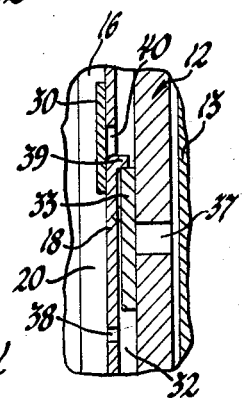
FIGURE 4 is a sectional view taken along the line 4—4 of FIGURE 3.

As best shown in FIGURES 3 and 4, plate 18 has an opening 38 formed therethrough connecting channel 32 to chamber 20. Plate 18 is provided with a struck down flange 39 gripping one end of arcuate shaped slipper 33 and forming a second opening 40 through plate 18. The valve plate 30 overlies opening 40 and closes off opening 40 when the power element is cold. Opening 38 is of smaller size than opening 40.

In operation, fan hub 13, cover 16, separator 18, member 24, and spring valve 28 all rotate as a unit. Slipper 33 in channel 32 also rotates as a unit with plate 18 due to the bent-in flange 39 on plate 18. These parts will all normally rotate at a speed less than that of engine driven rotor 12, which rotates at a speed proportional to engine speed. When rotor 12 rotates, viscous fluid in reservoir chamber 19 is thrown radially outwardly towards the outer periphery of the chamber due to centrifugal force imparted to the fluid by the rotor. The fluid therefore tends to enter channel 32 from both sides of the rotor. Fluid is permitted to enter channel 32 from the side of the rotor adjacent fan hub 13 through opening 36. Fluid from the side of the rotor adjacent plate 18 passes radially outwardly to channel 32 through the space between the rotor and the plate. The fluid in channel 32 tends to rotate at the speed of rotation of rotor 12. Slipper 33 in channel 32 rotates at fan speed which is slower than the speed of rotation of rotor 12. Due to the difference in speed of rotation of fluid in channel 32 and the speed of rotation of slipper 33, the slipper 33 acts as a pump to force fluid from channel 32 through the relatively small opening 38 in plate 18, thus causing a loss of drag in the labyrinth area between the rotor 12 and fan hub 13 at the concentric rings 34 and 35. The fan speed therefore slows down relative to the speed of rotation of rotor 12.

Upon a rise in the air temperature under the hood, the temperature responsive power element 21 forces plunger 26 inwardly against member 24 and compresses spring 27. Flange 25 of member 24 not only functions as a spring seat but also actuates arm 31 of spring valve 28 to cause the valve to pivot about foot 29 to raise the plate portion 30 of the valve off of plate member 18 to open up the relatively large opening 40 in plate 18, and allowing centrifugal force to drive the fluid through opening 40 into the chamber 19 and into the labyrinth space between the rotor 12 and fan hub 13 causing the fan to speed up.

It will be apparent that the slipper 33 continuously pumps the viscous fluid through small opening 38, so long as the rotor 12 rotates faster than fan hub 13. With valve 28 closed, the fan speed will be slow relative to rotor 12. The further valve 28 is opened by plunger 26, the faster will be the speed of rotation of fan hub 13. Viscous fluid will simultaneously be passing from chamber 19 to chamber 20 through small opening 38 and re-entering chamber 19 from chamber 20 through large opening 40 when valve 28 is open. The position of plate 30 of valve 28 with respect to opening 40 may be varied in accordance with cooling requirements to vary the rate of return of fluid to chamber 19 from chamber 20. Thus, the amount of fluid in chamber 19, assuming that rotor 12 is rotating faster than fan hub 13 will depend upon a balance between the amount of fluid pumped out of chamber 19 through small opening 38 by slipper 33 and the amount of fluid permitted to return to chamber 19 through relatively large opening 40 by valve plate 30 under control of temperature responsive power element 21.

It will be noted that the design is of simple and economical construction, comprising few parts which are easily and economically manufactured and assembled. The design is particularly adapted for use with heavy viscous working fluids and arranged to control the quantity of working fluid in working chamber 19 by means of a power element of commercial manufacture and a spring of economical design. The arcuate shaped slipper 33 provides a positive pumping action to improve the performance and is likewise of economical construction. The loss of viscous drag due to the pumping action of slipper 33 may be such that the annular rings 34 and 35 will be unable to drive the fan at all in the event that valve 30 is closed. On the other hand, fan blades 14 may rotate at substantially engine speed if valve 30 remains open to permit sufficient quantity of viscous fluid to reenter working chamber 19. Between these extremes fan speed may vary infinitely between zero and the speed of rotation of impeller 12. The control provides for graduated speed changes of the fan in accordance with cooling demand, this operating the fan at the most economical speed for providing adequate, yet not excessive engine cooling. This reduces both fan noise and power consumption of the fan to a minimum.

The arrangement whereby the turbine, fan blades and cover are rotatably supported upon stub shaft 10 by the single ball bearing 15 provides an economical and compact design. The power element 21 is coaxial with shaft 10 further contributing to the compactness of the overall design, which is important, particularly in automotive applications. The cover serves as a retainer both for power element 21 and for separator plate 18, the plate being clamped between the cover and turbine. An additional advantage of the arrangement arises from the use of plate valve 30 with relatively long actuator arm 31 in conjunction with power element 21. Power elements of this type are characterized by the fact that they are capable of exerting rather large force but have a very limited range of travel of the plunger. In the present arrangement it has been found that a very short motion of plunger 26, acting through relatively long arm 31 will cause valve 28 to pivot about foot 29 to give a relatively large movement of valve plate 30 for a short movement of plunger 26. This multiplication of the motion of plunger 26 on the action of valve portion 30 provides very satisfactory control of the fan speed in accordance with cooling requirements.

I claim:

1. A control for viscous fluid coupling of the type having a closed container having viscous working fluid therein and a separator dividing said container into a working chamber and a fluid reservoir, said working chamber having cooperating drive and driven members therein for driving said container, an opening through said separator for permitting continuous fluid flow from said working chamber to said reservoir, a second opening through said separator for permitting fluid flow from said reservoir to said working chamber, said control including a temperature responsive power element supported upon said container having a head portion exterior of said reservoir and a body portion extending into said reservoir, said power element having a plunger disposed for reciprocatory motion with respect to said body portion in response to variation of temperature of said head portion, a valve normally effective to block off said second opening when said power element is cold, said valve having a plate portion overlying said second opening and a foot portion seated on said separator, said valve having an upstanding arm formed integrally with said plate portion and said foot portion, and means connecting said plunger to said arm for causing pivotal motion of said valve about said foot portion in response to reciprocatory motion of said plunger.

2. A control for a viscous fluid coupling of the type having a closed container having viscous fluid therein and having a separator dividing said container into a working chamber and a fluid reservoir, said working chamber having drive and driven members therein for driving said container, an opening through said separator for permitting fluid flow from said working chamber to said reservoir, a second opening in said separator for permitting fluid flow from said reservoir to said working chamber, said control including a temperature responsive power element supported upon said container having a head portion exterior of said reservoir and a body portion extending through said container into said reservoir, said power element having a plunger extending from said body portion into said reservoir and movable toward said separator in response to rise in temperature of said head portion, a force transfer member carried by said body portion and axially movable thereon in response to movement of said plunger, and a valve adapted to control flow of fluid through said second opening, said valve including a plate portion overlying said second opening, an upstanding arm and a foot member, said plate portion and foot member lying in a common plane and normally in contact with said separator, said plate portion, foot member and upstanding arm being formed integrally from a single blank of material, said force transfer member being effective to move said arm to pivot said valve about said foot member to raise said plate portion from said second opening to thereby permit fluid flow through said second opening in response to movement of said plunger into said reservoir.

3. A control for a viscous fluid coupling of the type having a closed container having viscous fluid therein and a separator dividing said container into a working chamber and a fluid reservoir, said working chamber having drive and driven members therein for driving said container, an opening through said separator for permitting continuous fluid flow from said working chamber to said reservoir, a second opening in said separator for permitting fluid flow from said reservoir to said working chamber, said control including a temperature responsive power element supported upon said container having a head portion disposed exterior of said container and a body portion extending through said container into said reservoir, said power element having a plunger extending from said body portion into said reservoir and axially movable with respect to said body portion toward said separator in response to rise of temperature of said head portion, a force transfer member in said reservoir supported upon the exterior surface of and movable with respect to said body portion in response to movement of said plunger, a spring seated upon said force transfer member and opposing movement of said force transfer member by said plunger, and a valve for controlling flow of fluid through said second opening, said valve comprising a flat plate portion overlying said second opening, a foot portion contacting said separator and an upstanding arm, said arm being movable axially by said force transfer member to pivot said flat plate portion about said foot portion in response to rise of temperature of said head portion of said power actuator to permit fluid flow through said second opening.

4. A control for a viscous fluid coupling of the type having a closed container having viscous fluid therein, said container having working fluid therein, a separator dividing said container into a working chamber and a reservoir, said working chamber having drive and driven members therein cooperating to drive said container, a first opening through said separator for permitting continuous fluid flow from said working chamber to said reservoir, a second opening through said separator for permitting fluid flow from said reservoir to said working chamber, a power element supported upon said container having a head portion exterior of said container and a body portion extending through said container into said reservoir, a plunger extending from said body portion movable axially with respect to said body portion toward said separator upon rise of temperature of said head portion, a cup-shaped force transfer member carried by the external surface of said body portion and axially movable with respect to said body portion in response to movement of said plunger, an annular flange on said force transfer member, a spring seated upon said separator and upon said flange for opposing axial movement of said force transfer member by said plunger, and a valve member having a valve portion overlying said second opening and contacting said separator to close off said second opening when said head portion is cool, said valve member also having a foot portion contacting said separator and an actuating arm contacting said flange, said plunger being effective to move said force transfer member and said arm axially toward said separator to pivot said valve portion about said foot member to raise said valve portion off of said second opening upon a rise in temperature of said head portion to permit fluid flow from said reservoir to said working chamber through said second opening.

References Cited in the file of this patent
UNITED STATES PATENTS

| | | |
|---|---|---|
| 809,896 | Bender | Jan. 9, 1906 |
| 1,439,763 | Schaffer | Dec. 26, 1922 |
| 2,529,794 | Brown | Nov. 14, 1950 |
| 2,551,249 | Dickens | May 1, 1951 |
| 2,838,244 | Oldberg | June 10, 1958 |
| 2,902,127 | Hardy | Sept. 1, 1959 |
| 2,935,291 | Stelzer | May 3, 1960 |
| 2,974,768 | Hause | Mar. 14, 1961 |
| 3,019,875 | Fowler | Feb. 6, 1962 |